(No Model.)　　　　　　　　　　　　　　　　　　2 Sheets—Sheet 1.
W. F. COCHRAN.
RIDING HARROW.
No. 519,321.　　　　　　　　　　Patented May 8, 1894.
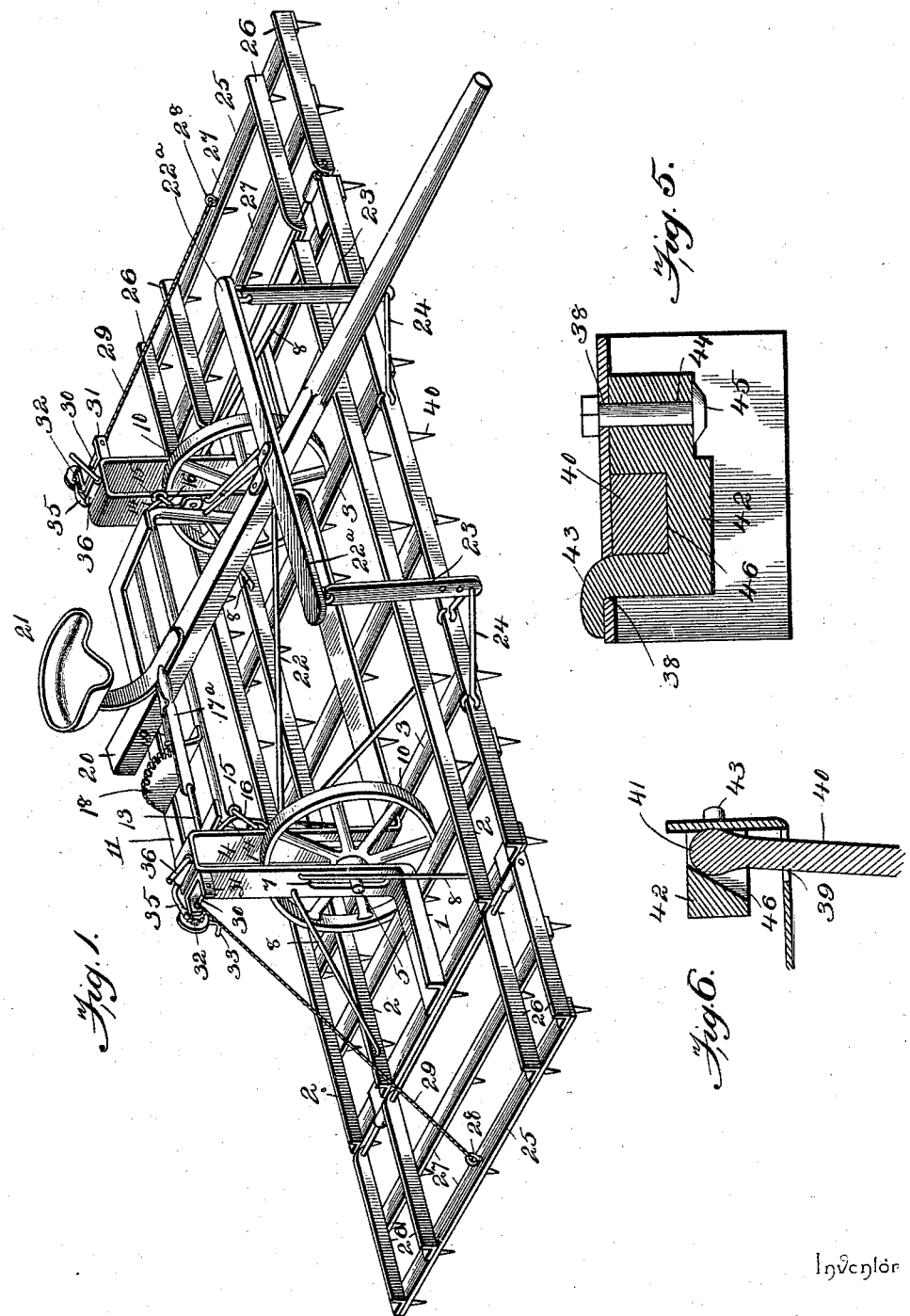
Witnesses　　　　　　　　　　　　　　　　　Inventor
　　　　　　　　By his Attorneys.　　William F. Cochran (No Model.) 2 Sheets—Sheet 2.
W. F. COCHRAN.
RIDING HARROW.
No. 519,321. Patented May 8, 1894.
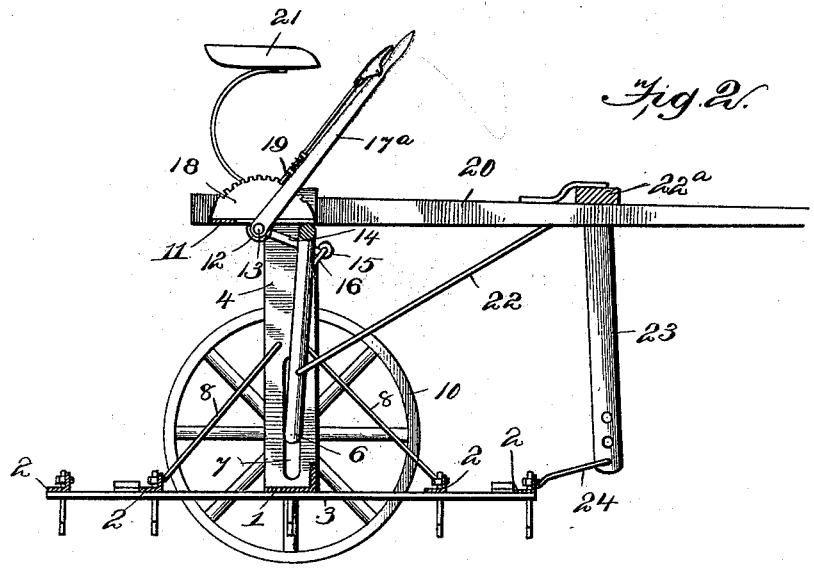
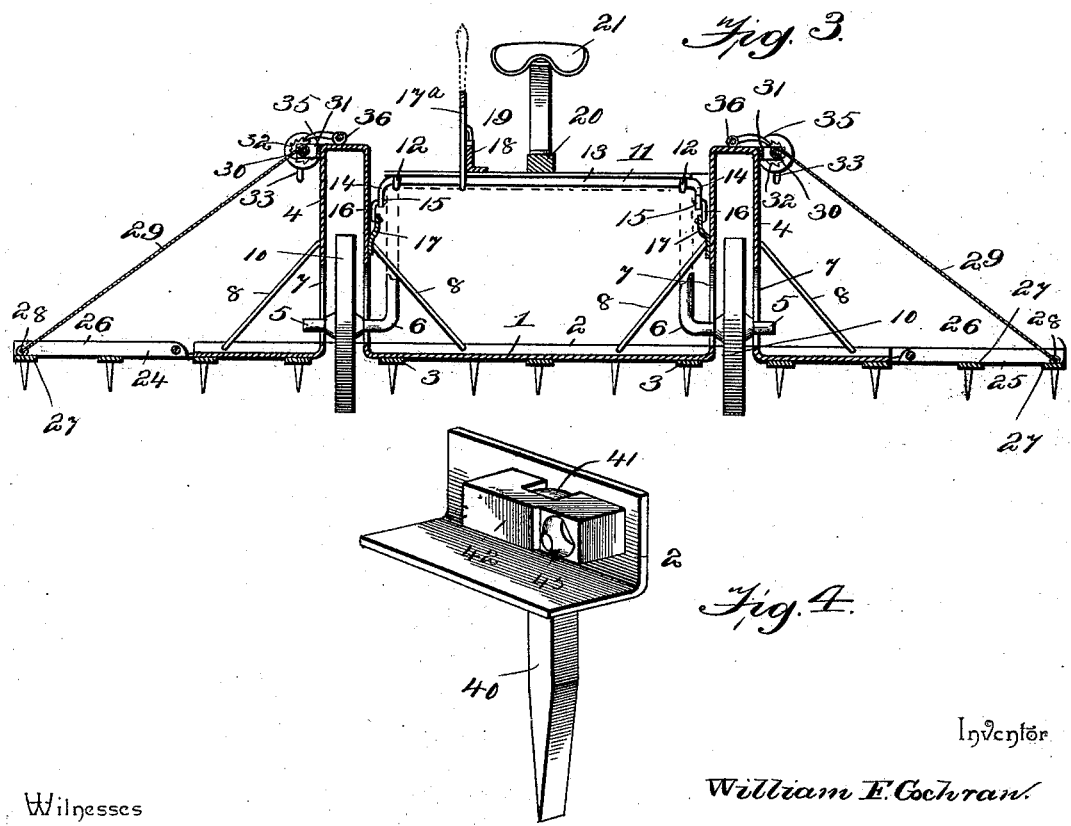
Witnesses
John C. Shaw
W. S. Duvall
Inventor
William F. Cochran
By Puis. Attorneys.

UNITED STATES PATENT OFFICE.

WILLIAM F. COCHRAN, OF OSBORNE, KANSAS.

RIDING-HARROW.

SPECIFICATION forming part of Letters Patent No. 519,321, dated May 8, 1894.

Application filed June 1, 1893. Serial No. 476,225. (No model.)

*To all whom it may concern:*

Be it known that I, WILLIAM F. COCHRAN, a citizen of the United States, residing at Osborne, in the county of Osborne and State of Kansas, have invented a new and useful Riding-Harrow, of which the following is a specification.

My invention relates to improvements in riding harrows; the objects in view being to produce a harrow of cheap and simple construction comprising the central main harrow frame and opposite side wings, and to so arrange the parts that the entire harrow including the main frame and the wings may be simultaneously and with one operation elevated out of operative position or lowered into operative position; and wherein the wings may be individually elevated out of operative position for the purpose of passing through gates, openings in fences, or avoiding hedges.

With these objects in view the invention consists in certain features of construction hereinafter specified and particularly pointed out in the claims.

Referring to the drawings:—Figure 1 is a perspective view of a harrow constructed in accordance with my invention. Fig. 2 is a vertical transverse sectional view. Fig. 3 is a longitudinal sectional view. Fig. 4 is a detail in perspective of one of the teeth and a portion of a harrow bar. Fig. 5 is a horizontal section of the same. Fig. 6 is a vertical sectional view through one of the harrow-bars, a tooth, and its fastening.

Like numerals of reference indicate like parts in all the figures of the drawings.

The main bar 1 of the harrow is of sufficient length to span the entire main harrow section, and said harrow section consists of a series of transverse and longitudinal harrow bars, the longitudinal bars being of L-shape in cross-section and designated as 2. The transverse bars 3 at each side of the center of the frame and between the opposite ends thereof form a space, and this space together with the entire frame is spanned by the said main bar 1. Above the spaces the main bar 1 is arched as at 4, and through the arches are passed the lower cranked bearings 5 of an arched axle 6, the said cranks of the axle being located in vertical slots 7 formed in the branches of the arches. The arches are braced by inclined braces 8 which lead to suitable points of the frame. Arranged within the arches and mounted loosely for rotation upon the cranked bearings of the axles are ground-wheels 10 the same being therefore located between the opposite ends of the main harrow frame and within the openings formed by the transverse connecting bars.

A horizontal frame 11 is supported by the arch of the axle and opposite bearings 12 are formed upon the under side and at the ends of this frame. A rock-shaft 13 is loosely journaled in the bearings and the ends beyond the bearings are bent to form crank-arms 14, which terminate in eyes 15. These eyes 15 are loosely connected by means of links 16 to brackets 17 located at the inner sides of and secured to the arches 4. Extending from the rock-shaft 13 at one side of the center is a lever 17 by which the rock-shaft may be rocked and at one side of the same and spanning this shaft and supported by the axle and frame 11 is a toothed segmental locking standard 18 into the teeth of which a locking pawl 19 carried by the lever 17 is adapted to engage. By swinging the lever 17 it will be seen that the rock-shaft may be oscillated or rocked as will also the rock-arms, and in this manner the standards and main harrow frame may be raised and lowered as will be the supplemental harrow frames or wings carried thereby and to be hereinafter described. A draft-tongue 20 surmounts the axle and frame 11 at the center thereof and projects beyond the front of the main harrow frame, and a driver's seat 21 surmounts the rear end of the draft-tongue adjacent to the lever 17. Hounds 22 extend from the draft-tongue rearward to the depending portions of the axle. The draft-tongue is surmounted by the usual double-tree $22^a$ from which are loosely suspended vertical draft-bars 23 having perforations for the accommodation of the usual single-trees and also for V-shaped draft-links 24, whose rear ends are connected with the front transverse harrow-bar.

Loosely hinged to the opposite sides of the main harrow frame, as at 25, are the wings or supplemental harrow sections, the same consisting, as is the case with the main harrow section, in a series of transverse harrow bars 26, L-shaped in cross section and connecting bars 27. The outer ends of these harrow bars are provided with eyes 28 to which are attached the outer ends of cables 29, the said cables being wound upon drums 30 arranged in bearings 31 at the outer sides of the arches near the upper ends thereof. The drums 31 are provided with ratchet wheels 32 and cranks 33 by which said drums may be operated. U-shaped pawls 35 are loosely mounted in bearings 36 upon the upper ends of the standards, one branch of each of the pawls engaging a ratchet wheel, while the remaining branch serves as a handle which may be grasped by the operator or driver for the purpose of throwing the pawl out of engagement with the ratchet.

This completes the construction of the harrow with the exception of the teeth, and I will here state that any style of tooth may be employed in connection with the same. I have, however, devised one form of tooth that I consider as superior in many respects to the ordinary tooth, and as well adapted for use in connection with this particular harrow, and which I will now proceed to describe. Each of the harrow bars is provided at intervals with a pair of holes 38 in their vertical flanges, and between the same and the lower flange with a rectangular opening 39. In these rectangular openings rigid teeth 40 are located, the upper ends of the teeth having heads 41 formed thereon. Cast-metal clips 42 serve to clamp the teeth at their upper ends against the vertical flanges of the harrow-bars, and said clips are provided at one end with curved lugs 43 which engage one of the openings of the pair, and at their opposite ends with perforations 44 through which bolts 45 are passed and through the remaining openings in the vertical flanges, nuts being applied to the opposite ends of the bolts. Between the lugs 43 and the openings 44 the clips are provided with recesses or gains 46 which fit the teeth and being inclined toward their bottom edges bind snugly thereupon, thus holding the teeth in position. While the teeth are thus held substantially rigid in position, yet it will be obvious that by reason of their rounded heads any excessive pressure against the lower ends of the teeth will cause them to swing backward or yield to such pressure, thereby avoiding breakage and enabling them to ride over an obstruction.

This being the construction of the harrow the operation will be readily apparent from the foregoing description, the said operation not differing materially from harrows now in use. It will be seen that through the medium of the windlasses or drums at opposite sides of the harrow either or both of the wings or supplemental harrow sections may be raised from an operative position or lowered to such position as the case may be and conveniently locked through the medium of the locking pawls with which the drums are provided. When traveling to or from the field of operation the wings may be thus folded or elevated to their highest degree, and through the medium of the hand-lever the main harrow section together with the wings raised vertically, so that the main section will clear the ground and not meet with any obstructions that may lie in its path. By this independent raising of the side sections or wings it will be seen that the harrow may be reduced to any width so as to pass through gates, may avoid stumps, or other obstructions, fences, or hedges, all as will be readily appreciated and understood by those skilled in the use of these machines.

By the use of the peculiar tooth-seat or fastening ordinary rigid teeth may be employed, which when broken may be readily replaced by simply loosening a single bolt.

Changes in the form, proportion, and the minor details of construction may be resorted to without departing from the principle or sacrificing any of the advantages of this invention.

Having described my invention, what I claim is—

1. In a harrow of the class described, the combination with the main harrow section having openings at each side of its center, the opposite U-shaped standards, slotted and bridging said openings, and the arched axle arranged between the standards and having lower cranked bearings extending through the slots and carrying ground-wheels, of a frame supported by the axle, bearings in the frame, a rock-shaft supported in the bearings and provided therebeyond with rock-arms, loose connections between said rock-arms and the standards, a hand-lever for operating the rock-shaft, and means for locking the same, substantially as specified.

2. In a harrow of the class described, the combination with the main harrow section having the openings at each side of its center, the transverse harrow bar spanning the section from end to end and arched above the openings and provided with slots, the arched axle having cranked bearings extending through the slots of the arches and provided with ground-wheels, of the frame supported by the axle and provided with opposite bearings, the rock-shaft journaled in the bearings and beyond the same provided with rock-arms, brackets extending from the inner sides of the standards, loose links connecting the brackets with the extremities of the rock-arms, a hand-lever mounted upon the shaft, a toothed segmental locking standard supported by the frame and axle and spanning the shaft, and a pawl arranged upon the hand-lever for engaging the teeth of the standard, substantially as specified.

3. In a harrow of the class described, the combination with the main harrow section having openings at each side of its center, inverted U-shaped standards arranged over the same and provided with slots, an arched axle having cranked bearings passing through the slots, ground-wheels arranged upon the bearings, means for raising and lowering said main frame, of opposite supplemental frames hinged to the opposite ends or sides of the main frame, eyes located in the free ends of said supplemental frames, drums carrying crank shafts journaled in bearings at the upper ends of the standards, cables between the same and the eyes, ratchet-wheels arranged upon said drum shafts, and U-shaped pawls arranged in bearings on the standards one branch of each pawl being bent to form a handle, substantially as specified.

4. In a harrow of the class described, the combination with the harrow-bar L-shaped in cross-section, provided at intervals with pairs of perforations in its vertical flange and below and between the same and in the horizontal flange with an opening, of a tooth loosely arranged in the opening and having a rounded convexed head located between the perforations a clip-block binding the convexed head against the vertical portion or flange of the L-shaped harrow-bar and having a curved lug at one end engaging one of the perforations and at its opposite end provided with a perforation aligning with the remaining perforation of the harrow bar, a bolt passed through said perforations and provided with a nut, said clip-block having an intermediate beveled recess for receiving the upper end and binding upon the head of the harrow-tooth, substantially as specified.

5. In a harrow of the class described, the combination with the harrow-bar L-shaped in cross-section, provided in the horizontal flange with an opening, of a tooth arranged loosely in the opening and having an enlarged rounded head, a clip-block having an intermediate beveled recess for receiving the upper end and binding the head of the harrow-tooth against the vertical flange of the L-shaped harrow-bar, and means for securing the clip-block to the vertical flange of the harrow bar, substantially as specified.

6. In a harrow of the class described, the main harrow section having the opposite arches or U-shaped standards, the sides of which are slotted, the wheels received within the arches or standards, the arched axle having its lower cranked ends passing through the slots and carrying the wheels, and mechanism for raising or lowering the axle and thereby raising or lowering the wheels, substantially as specified.

7. In a harrow of the class described, the main harrow section having the opposite arches or U-shaped standards, the sides of which are slotted, the wheels received within the arches or standards, the arched axle having its lower cranked ends passing through the slots and carrying the wheels, mechanism for raising or lowering the axle and thereby raising or lowering the wheels, the side harrow sections, and drums carried by the arches or standards and provided with ropes connecting with the side harrow sections, substantially as specified.

In testimony that I claim the foregoing as my own I have hereto affixed my signature in the presence of two witnesses.

WILLIAM F. COCHRAN.

Witnesses:
C. M. NIQUETTE,
C. E. JEWELL.